(12) United States Patent
Li et al.

(10) Patent No.: US 11,616,412 B2
(45) Date of Patent: Mar. 28, 2023

(54) MAGNETIC LIQUID SEALING DEVICE RESISTIBLE TO AXIAL AND RADIAL VIBRATION

(71) Applicants: Tsinghua University, Beijing (CN); BEIJING JIAOTONG UNIVERSITY, Beijing (CN)

(72) Inventors: Decai Li, Beijing (CN); Zhibin Wang, Beijing (CN); Xinzhi He, Beijing (CN); Sijia Liu, Beijing (CN)

(73) Assignees: TSINGHUA UNIVERSITY, Beijing (CN); BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 17/568,419

(22) Filed: Jan. 4, 2022

(65) Prior Publication Data
US 2023/0030538 A1 Feb. 2, 2023

(30) Foreign Application Priority Data
Aug. 2, 2021 (CN) .......................... 202110880424.1

(51) Int. Cl.
*H02K 5/10* (2006.01)
*H01F 7/02* (2006.01)
*H01F 1/44* (2006.01)

(52) U.S. Cl.
CPC ................. *H02K 5/10* (2013.01); *H01F 1/44* (2013.01); *H01F 7/02* (2013.01)

(58) Field of Classification Search
CPC ................ H02K 5/10; H01F 1/44; H01F 7/02
See application file for complete search history.

(56) References Cited

FOREIGN PATENT DOCUMENTS

| CN | 112431927 A | * | 3/2021 | ............... F16J 15/43 |
|---|---|---|---|---|
| PL | 406561 A1 | * | 6/2015 | |
| PL | 220231 B1 | * | 9/2015 | |
| PL | 225537 B1 | * | 4/2017 | |

* cited by examiner

*Primary Examiner* — Mohamad A Musleh
(74) *Attorney, Agent, or Firm* — Hodgson Russ LLP

(57) ABSTRACT

The present disclosure relates to a magnetic liquid sealing device. When a rotating shaft of the device axially vibrates, an outer ring of a bearing may not be provided with a rim, and a J-shaped bush and U-shaped sleeve ring can have relative displacement in an axial direction. When the rotating shaft radially vibrates, the U-shaped sleeve ring may deviate radially to allow sealing gaps, so as to prevent a bump between a pole shoe and J-shaped bush. Under action of a support spring and axial spring, sealing rings can be pressed to allow for sealing, and the U-shaped sleeve ring may not be in direct contact with an end cap, so as to avoid face friction.

5 Claims, 1 Drawing Sheet

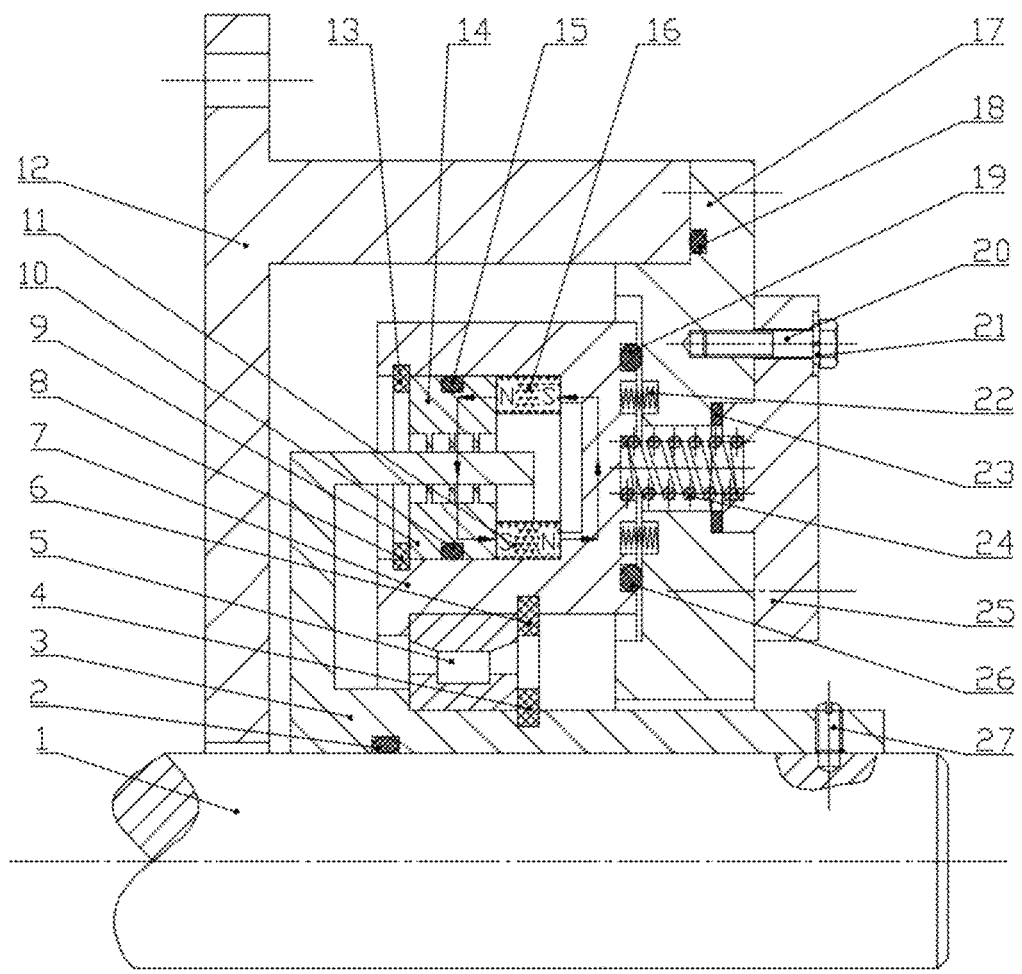

MAGNETIC LIQUID SEALING DEVICE RESISTIBLE TO AXIAL AND RADIAL VIBRATION

CROSS-REFERENCE TO RELATED APPLICATION(S)

This application claims priority to Chinese Patent Application No. 202110880424.1, filed Aug. 2, 2021, the entire disclosure of which is incorporated herein by reference.

FIELD

The present disclosure relates to a field of sealing technical in mechanical engineering, and more particularly, to a magnetic liquid sealing device resistible to axial and radial vibration.

BACKGROUND

Magnetic liquid seals are widely used, especially in sealing field due to advantages of zero leakage, low friction and long life. However, when the magnetic liquid sealing device is used in high-speed and heavy-load working conditions, a rotating shaft will generate axial and radial vibration when being under stress or heat, thereby affecting size of sealing gap and sealing performance of sealing members, and even a pole tooth on a pole shoe and a rotating member will be bumped and damaged. Therefore, a magnetic liquid sealing device resistible to axial and radial vibration is provided.

SUMMARY

The present disclosure aims to solve problems of size change of a sealing gap and bump between a pole shoe and a rotating member caused by axial and radial vibration.

The technical solution adopted by the present disclosure is to provide a magnetic liquid sealing device resistible to axial and radial vibration. The device includes a rotating shaft (1), a sealing ring I (2), a J-shaped bush (3), a bearing collar I (4), a bearing (5), a bearing collar II (6), a U-shaped sleeve ring (7), a pole shoe collar I (8), an inner pole shoe (9), an inner sealing ring (10), an inner permanent magnet (11), a housing (12), a pole shoe collar II (13), an outer pole shoe (14), an outer sealing ring (15), an outer permanent magnet (16), an end cap (17), a sealing ring II (18), a sealing ring III (19), a tension bolt (20), a spring washer (21), a support spring (22), a sealing gasket (23), an axial spring (24), a gland (25), a sealing ring IV (26) and a set screw (27).

Connections among various parts of the device: an inner circular surface of the inner pole shoe (9) and an outer circular surface of the outer pole shoe (14) are both defined with annular grooves thereon, the inner sealing ring (10) and the outer sealing ring (15) are mounted in the corresponding grooves respectively, to form the inner pole shoe (9) with the inner sealing ring (10) and the outer pole shoe (14) with the outer sealing ring (15), and an outer circular surface of the inner pole shoe (9) and an inner circular surface of the outer pole shoe (14) are both provided with pole teeth.

The inner permanent magnet (11), the outer permanent magnet (16), the inner pole shoe (9) with the inner sealing ring (10), and the outer pole shoe (14) with the outer sealing ring (15) are successively mounted into the U-shaped sleeve ring (7), a cavity of the U-shaped sleeve ring (7) is defined with two annular grooves, the pole shoe collar I (8) and the pole shoe collar II (13) are snapped into the corresponding two annular grooves, respectively, an outer ring of the bearing (5) is in an interference fit with an inner circular surface of the U-shaped sleeve ring (7), the inner circular surface of the U-shaped sleeve ring (7) is defined with an annular groove, the bearing collar II (6) is snapped into the annular groove to axially position the outer ring of the bearing (5), a right end face of the U-shaped sleeve ring (7) is provided with the axial springs (24), the support springs (22) are arranged around each axial spring (24), the right end face of the U-shaped sleeve ring (7) is further defined with two annular grooves, and the sealing ring III (19) and sealing ring IV (26) are mounted in the corresponding grooves, respectively.

The bearing (5), the bearing collar II (6), the U-shaped sleeve ring (7), the pole shoe collar I (8), the inner pole shoe (9), the inner sealing ring (10), the inner permanent magnet (11), the pole shoe collar II (13), the outer pole shoe (14), the outer sealing ring (15), the outer permanent magnet (16), the sealing ring III (19), the support springs (22), the axial springs (24) and the sealing ring IV (26) are mounted together as an assembly I, the assembly I is fitted over the J-shaped bush (3), an outer circular surface of the J-shaped bush (3) is defined with an annular groove, the bearing collar I (4) is snapped into the annular groove to axially position an inner ring of the bearing (5), an inner circular surface of the J-shaped bush (3) is defined with an annular groove, and the sealing ring I (2) is mounted in the annular groove.

An outer ring of a left end face of the end cap (17) is defined with an annular groove, the sealing ring II (18) is mounted in the annular groove; the end cap (17) is provided with a stepped hole, the sealing gasket (23) is placed in a large hole of the stepped hole, the axial springs (24) mounted on the right end face of the U-shaped sleeve ring (7) pass through the stepped hole and are fixed on left end faces of the glands (25), respectively, a hole diameter of a small hole of the stepped hole is larger than an outer diameter of the axial spring (24), and positioning grooves are defined around the stepped hole on the left end face of the end cap (17), respectively, so as to fix the other end of the support spring (22) mounted on the right end face of the U-shaped sleeve ring (7).

Threaded holes are defined around the stepped hole on the right end face of the end cap (17), respectively, the gland (25) is provided with a stepped hole, the spring washer (21) is placed in a large hole of the stepped hole, and the gland (25) is tightly fixed on the end cap (17) by the tension bolts (20).

The assembly I, the sealing ring I (2), the J-shaped bush (3), the bearing collar I (4), the end cap (17), the sealing ring II (18), the tension bolt (20), the spring washer (21), the sealing gasket (23) and the glands (25) are mounted together as an assembly II, a gap between the pole teeth of the inner pole shoe (9) and the J-shaped bush (3), and a gap between the pole teeth of the outer pole shoe (14) and the J-shaped bush (3) are sealing gaps, and sufficient magnetic liquid is injected into the sealing gaps, the assembly II injected with magnetic liquid is mounted in the housing (12), the J-shaped bush (3) in the assembly II is fitted over the rotating shaft (1), the housing (12) and the end cap (17) are fixed by bolts, and a right end of the outer circular surface of the J-shaped bush (3) is provided with a threaded hole, such that the J-shaped bush (3) is tightly fixed on the rotating shaft (1) through the set screw (27).

Both the inner permanent magnet (11) and the outer permanent magnet (16) are axially magnetized permanent magnet rings, and the magnetic poles of the inner permanent magnet (11) and the outer permanent magnet (16) are opposite along an axial direction of the rotating shaft (1).

The outer ring of the bearing (5) is not provided with a rim, thereby allowing the rotating shaft (1) to axially displace relative to the housing (12) in both directions.

The working principle of the present disclosure: when the rotating shaft (1) axially and radially vibrates, the J-shaped bush (3) vibrates synchronously with the rotating shaft (1); in an axial direction, the outer ring of the bearing (5) is not provided with the rim, such that the J-shaped bush (3) enables to move axially in a cavity enclosed by the U-shaped sleeve ring (7); in a radial direction, radial vibration of the rotating shaft (1) is transmitted to the U-shaped sleeve ring (7) via the bearing (5), such that the U-shaped sleeve ring (7) vibrates synchronously in the radial direction with the rotating shaft (1) and the bearing (5), so as to ensure size of the sealing gaps to be unchanged.

The axial spring (24) is stretched and the support spring (22) is pressed, the two work together such that the sealing ring III (19) and the sealing ring IV (26) are tightly pressed to ensure the sealing, and the right end face of the U-shaped sleeve ring (7) and the left end face of the end cap (17) are not in direct contact and then cause friction.

Compared with a conventional magnetic liquid sealing device, the present disclosure has the beneficial effects that the magnetic liquid sealing device is resistible to the axial and radial vibration of the rotating shaft, so as to prevent size of the sealing gap from changing with the vibration of the rotating shaft, and prevent the bump between the pole shoe and the rotating member or even the damage of sealing members caused by the vibration, thereby ensuring sealing performance of the sealing members when the rotating shaft vibrates.

BRIEF DESCRIPTION OF THE DRAWINGS

FIG. 1 is a schematic view of a magnetic liquid sealing device resistible to axial and radial vibration of the present disclosure.

In FIG. 1: rotating shaft (1), sealing ring I (2), J-shaped bush (3), bearing collar I (4), bearing (5), bearing collar II (6), U-shaped sleeve ring (7), pole shoe collar I (8), inner pole shoe (9), inner sealing ring (10), inner permanent magnet (11), housing (12), pole shoe collar II (13), outer pole shoe (14), outer sealing ring (15), outer permanent magnet (16), end cap (17), sealing ring II (18), sealing ring III (19), tension bolt (20), spring washer (21), support spring (22), sealing gasket (23), axial spring (24), gland (25), sealing ring IV (26), set screw (27).

DETAILED DESCRIPTION

Embodiments of the present disclosure are described in detail below, which are only used to explain the present disclosure and cannot be understood as a limitation to the present disclosure. The present disclosure is further described with reference to the accompanying drawing:

A magnetic liquid sealing device resistible to axial and radial vibration is provided and includes a rotating shaft (1), a sealing ring I (2), a J-shaped bush (3), a bearing collar I (4), a bearing (5), a bearing collar II (6), a U-shaped sleeve ring (7), a pole shoe collar I (8), an inner pole shoe (9), an inner sealing ring (10), an inner permanent magnet (11) and a housing (12), a pole shoe collar II (13), an outer pole shoe (14), an outer sealing ring (15), an outer permanent magnet (16), an end cap (17), a sealing ring II (18), a sealing ring III (19), a tension bolt (20), a spring washer (21), a support spring (22), a sealing gasket (23), an axial spring (24), a gland (25), a sealing ring IV (26) and a set screw (27).

Connections among various parts of the device: an inner circular surface of the inner pole shoe (9) and an outer circular surface of the outer pole shoe (14) are both defined with annular grooves thereon, the inner sealing ring (10) and the outer sealing ring (15) are mounted in the corresponding grooves respectively, to form the inner pole shoe (9) with the inner sealing ring (10) and the outer pole shoe (14) with the outer sealing ring (15), and an outer circular surface of the inner pole shoe (9) and an inner circular surface of the outer pole shoe (14) are both provided with pole teeth.

The inner permanent magnet (11), the outer permanent magnet (16), the inner pole shoe (9) with the inner sealing ring (10), and the outer pole shoe (14) with the outer sealing ring (15) are successively mounted into the U-shaped sleeve ring (7), a cavity of the U-shaped sleeve ring (7) is defined with two annular grooves, the pole shoe collar I (8) and the pole shoe collar II (13) are snapped into the corresponding two annular grooves, respectively, an outer ring of the bearing (5) is in an interference fit with an inner circular surface of the U-shaped sleeve ring (7), the inner circular surface of the U-shaped sleeve ring (7) is defined with an annular groove, the bearing collar II (6) is snapped into the annular groove to axially position the outer ring of the bearing (5), a right end face of the U-shaped sleeve ring (7) is provided with the axial springs (24), the support springs (22) are arranged around each axial spring (24), the right end face of the U-shaped sleeve ring (7) is further defined with two annular grooves, and the sealing ring III (19) and sealing ring IV (26) are mounted in the corresponding grooves, respectively.

The bearing (5), the bearing collar II (6), the U-shaped sleeve ring (7), the pole shoe collar I (8), the inner pole shoe (9), the inner sealing ring (10), the inner permanent magnet (11), the pole shoe collar II (13), the outer pole shoe (14), the outer sealing ring (15), the outer permanent magnet (16), the sealing ring III (19), the support springs (22), the axial springs (24) and the sealing ring IV (26) are mounted together as an assembly I, the assembly I is fitted over the J-shaped bush (3), an outer circular surface of the J-shaped bush (3) is defined with an annular groove, the bearing collar I (4) is snapped into the annular groove to axially position an inner ring of the bearing (5), an inner circular surface of the J-shaped bush (3) is defined with an annular groove, and the sealing ring I (2) is mounted in the annular groove.

An outer ring of a left end face of the end cap (17) is defined with an annular groove, the sealing ring II (18) is mounted in the annular groove; the end cap (17) is defined with a stepped hole, the sealing gasket (23) is placed in a large hole of the stepped hole, the axial springs (24) mounted on the right end face of the U-shaped sleeve ring (7) pass through the stepped hole and are fixed on left end faces of the glands (25), respectively, a hole diameter of a small hole of the stepped hole is larger than an outer diameter of the axial spring (24), and positioning grooves are defined around the stepped hole on the left end face of the end cap (17), respectively, so as to fix the other end of the support spring (22) mounted on the right end face of the U-shaped sleeve ring (7).

Threaded holes are defined around the stepped hole on the right end face of the end cap (17), respectively, the gland (25) is defined with a stepped hole, the spring washer (21) is placed in a large hole of the stepped hole, and the gland (25) is tightly fixed on the end cap (17) by the tension bolts (20).

The assembly I, the sealing ring I (2), the J-shaped bush (3), the bearing collar I (4), the end cap (17), the sealing ring II (18), the tension bolt (20), the spring washer (21), the sealing gasket (23) and the glands (25) are mounted together as an assembly II, a gap between the pole teeth of the inner pole shoe (9) and the J-shaped bush (3), and a gap between the pole teeth of the outer pole shoe (14) and the J-shaped bush (3) are sealing gaps, and sufficient magnetic liquid is injected into the sealing gaps, the assembly II injected with magnetic liquid is mounted in the housing (12), the J-shaped bush (3) in the assembly II is fitted over the rotating shaft (1), the housing (12) and the end cap (17) are fixed by bolts, and a right end of the outer circular surface of the J-shaped bush (3) is provided with a threaded hole, such that the J-shaped bush (3) is tightly fixed on the rotating shaft (1) through the set screw (27).

The bearing (5) adopts a cylindrical roller bearing with an outer ring not provided with a rim, thereby allowing the rotating shaft (1) to axially displace relative to the housing (12) in both directions.

The J-shaped bush (3), the U-shaped sleeve ring (7), the inner pole shoe (9) and the outer pole shoe (14) adopts 2Cr13 with good magnetic conductivity.

The end cap (17), the support spring (22) and the axial spring (24) are made of non-magnetic materials.

The inner permanent magnet (11) and the outer permanent magnet (16) are made of rubidium iron boron material.

Both the inner permanent magnet (11) and the outer permanent magnet (16) are axially magnetized permanent magnet rings, and the magnetic poles of the inner permanent magnet (11) and the outer permanent magnet (16) are opposite along an axial direction of the rotating shaft (1).

There are four axial springs (24) evenly distributed on the right end face of the U-shaped sleeve ring (7) at an interval of 90 degrees, four support springs (22) are evenly distributed around each axial spring (24) at an interval of 90 degrees, and there are four glands (25).

Composition of a magnetic circuit is described below: the magnetic field generated by the outer permanent magnet (16) from N pole passes through the outer pole shoe (14), magnetic liquid, J-shaped bush (3), magnetic liquid and the inner pole shoe (9) to reach S pole of the inner permanent magnet (11), and the magnetic field generated by the inner permanent magnet (11) from N pole passes through the U-shaped sleeve ring (7) to reach S pole of the outer permanent magnet (16).

What is claimed is:

1. A magnetic liquid sealing device resistible to axial and radial vibrations, comprising:

a rotating shaft (1), a sealing ring I (2), a J-shaped bush (3), a bearing collar I (4), a bearing (5), a bearing collar II (6), a U-shaped sleeve ring (7), a pole shoe collar I (8), an inner pole shoe (9), an inner sealing ring (10), an inner permanent magnet (11), a housing (12), a pole shoe collar II (13), an outer pole shoe (14), an outer sealing ring (15), an outer permanent magnet (16), an end cap (17), a sealing ring II (18), a sealing ring III (19), a tension bolt (20), a spring washer (21), a support spring (22), a sealing gasket (23), an axial spring (24), a gland (25), a sealing ring IV (26), and a set screw (27);

connections among various parts of the device: wherein the inner sealing ring (10) and the outer sealing ring (15) are mounted in annular grooves defined on an inner circular surface of the inner pole shoe (9) and an outer circular surface of the outer pole shoe (14), respectively, to form the inner pole shoe (9) with the inner sealing ring (10) and the outer pole shoe (14) with the outer sealing ring (15), and an outer circular surface of the inner pole shoe (9) and an inner circular surface of the outer pole shoe (14) are both provided with pole teeth;

wherein the inner permanent magnet (11), the outer permanent magnet (16), the inner pole shoe (9) with the inner sealing ring (10), and the outer pole shoe (14) with the outer sealing ring (15) are successively mounted into the U-shaped sleeve ring (7), the pole shoe collar I (8) and the pole shoe collar II (13) are snapped into corresponding two annular grooves of an inner side of the U-shaped sleeve ring (7), respectively; an outer ring of the bearing (5) is in an interference fit with an inner circular surface of the U-shaped sleeve ring (7), the bearing collar II (6) is snapped into an annular groove of the inner circular surface of the U-shaped sleeve ring (7), to axially position the outer ring of the bearing (5), a right end face of the U-shaped sleeve ring (7) is provided with the axial springs (24), the support springs (22) are arranged around each axial spring (24), and the sealing ring III (19) and sealing ring IV (26) are mounted in corresponding two annular grooves of the right end face of the U-shaped sleeve ring (7), respectively;

wherein the bearing (5), the bearing collar II (6), the U-shaped sleeve ring (7), the pole shoe collar I (8), the inner pole shoe (9), the inner sealing ring (10), the inner permanent magnet (11), the pole shoe collar II (13), the outer pole shoe (14), the outer sealing ring (15), the outer permanent magnet (16), the sealing ring III (19), the support springs (22), the axial springs (24) and the sealing ring IV (26) are mounted together as an assembly I, the assembly I is fitted over the J-shaped bush (3), the bearing collar I (4) is snapped into an annular groove of an outer circular surface of the J-shaped bush (3), to axially position an inner ring of the bearing (5), and the sealing ring I (2) is mounted in an annular groove of an inner circular surface of the J-shaped bush (3);

wherein the sealing ring II (18) is mounted in an annular groove of an outer ring of a left end face of the end cap (17), the end cap (17) is defined with a stepped hole, the sealing gasket (23) is placed in a large hole of the stepped hole, the axial springs (24) mounted on the right end face of the U-shaped sleeve ring (7) pass through the stepped hole and are fixed on left end faces of the glands (25), respectively, a hole diameter of a small hole of the stepped hole is larger than an outer diameter of the axial spring (24), and positioning grooves are defined around the stepped hole on the left end face of the end cap (17), respectively, so as to fix the other end of the support spring (22) mounted on the right end face of the U-shaped sleeve ring (7);

wherein threaded holes are defined around the stepped hole on the right end face of the end cap (17), respectively, the gland (25) is provided with a stepped hole, the spring washer (21) is placed in a large hole of the stepped hole, and the gland (25) is tightly fixed on the end cap (17) by the tension bolts (20);

wherein the assembly I, the sealing ring I (2), the J-shaped bush (3), the bearing collar I (4), the end cap (17), the sealing ring II (18), the tension bolt (20), the spring washer (21), the sealing gasket (23) and the glands (25) are mounted together as an assembly II, sufficient magnetic liquid is injected into sealing gaps of the assembly II, the assembly II injected with magnetic liquid is mounted in the housing (12), the J-shaped bush (3) in the assembly II is fitted over the rotating shaft (1), the housing (12) and the end cap (17) are fixed by bolts, and a right end of the outer circular surface of the J-shaped bush (3) is provided with a threaded hole, such that the J-shaped bush (3) is tightly fixed on the rotating shaft (1) through the set screw (27).

2. The magnetic liquid sealing device resistible to axial and radial vibration according to claim 1, wherein
the outer ring of the bearing (5) is not provided with a rim, thereby allowing the rotating shaft (1) to axially displace relative to the housing (12) in both directions.

3. The magnetic liquid sealing device resistible to axial and radial vibration according to claim 1, wherein:
the inner permanent magnet (11) and the outer permanent magnet (16) are axially magnetized permanent magnet rings, and the magnetic poles of the inner permanent magnet (11) and the outer permanent magnet (16) are opposite along an axial direction of the rotating shaft (1).

4. The magnetic liquid sealing device resistible to axial and radial vibration according to claim 1, wherein:
since the outer ring of the bearing (5) is not provided with a rim, when the rotating shaft (1) vibrates axially, the sealing ring I (2), the J-shaped bush (3), the bearing collar I (4), the inner ring of the bearing (5) and the set screw (27) move axially with the rotating shaft (1), wherein the J-shaped bush (3) axially displaces in a cavity enclosed by the U-shaped sleeve ring (7) to ensure the sealing gaps to be unchanged.

5. The magnetic liquid sealing device resistible to axial and radial vibration according to claim 1, wherein:
when the rotating shaft (1) radially vibrates, the sealing ring I (2), the J-shaped bush (3), the bearing collar I (4) and the set screw (27) vibrate with the rotating shaft; the bearing (5) transmits radial vibration to the U-shaped sleeve ring (7), then the assembly I deviates radially to ensure the sealing gaps to be unchanged, and a slight friction occurs among the sealing ring III (19), the sealing ring IV (26) and the left end face of the end cap (17);
the axial spring (24) is in a stretched state and the support spring (22) is in a compressed state, so as to ensure that the right end face of the U-shaped sleeve ring (7) is not in direct contact with the left end face of the end cap (17) to avoid friction and wear on the two end faces, and ensure that the sealing ring III (19) and sealing ring IV (26) are tightly pressed to the left end face of the end cap (17) to realize sealing and avoid leakage of sealed medium from here.

\* \* \* \* \*